(12) United States Patent
Chen

(10) Patent No.: US 9,500,005 B2
(45) Date of Patent: Nov. 22, 2016

(54) GEAR STRUCTURE FOR ELECTRONIC LOCK

(71) Applicant: Jie-Fu Chen, Chiayi (TW)

(72) Inventor: Jie-Fu Chen, Chiayi (TW)

( * ) Notice: Subject to any disclaimer, the term of this patent is extended or adjusted under 35 U.S.C. 154(b) by 489 days.

(21) Appl. No.: 14/165,932

(22) Filed: Jan. 28, 2014

(65) Prior Publication Data

US 2015/0211260 A1    Jul. 30, 2015

(51) Int. Cl.
*E05B 47/00* (2006.01)
*E05B 47/02* (2006.01)
*F16H 57/02* (2012.01)

(52) U.S. Cl.
CPC ......... *E05B 47/0012* (2013.01); *E05B 47/026* (2013.01); *E05B 2047/002* (2013.01); *E05B 2047/0067* (2013.01); *F16H 2057/02034* (2013.01)

(58) Field of Classification Search
CPC ............... E05B 47/0012; E05B 47/26; E05B 2047/002; E05B 2047/0067; F16H 2057/02034
USPC .......................................................... 74/625
See application file for complete search history.

(56) References Cited

U.S. PATENT DOCUMENTS

| | | | | |
|---|---|---|---|---|
| 6,012,310 A * | 1/2000 | Hsiao | ................ | E05B 47/0012 292/144 |
| 6,471,257 B1* | 10/2002 | Lu | .................. | E05B 47/0012 292/144 |
| 6,598,909 B2* | 7/2003 | Lu | .................. | E05B 47/0012 292/144 |
| 7,516,633 B1* | 4/2009 | Chang | ............... | E05B 13/101 292/251.5 |
| 8,490,445 B2* | 7/2013 | Chiou | ............... | E05B 47/0012 70/224 |
| 2007/0051145 A1* | 3/2007 | Chang | ............... | E05B 13/108 70/279.1 |
| 2012/0036904 A1* | 2/2012 | Chang | ............... | E05B 47/02 70/91 |

\* cited by examiner

*Primary Examiner* — William C Joyce
(74) *Attorney, Agent, or Firm* — Alan D. Kamrath; Kamrath IP Lawfirm, P.A.

(57) ABSTRACT

A gear structure for an electronic lock contains: a housing including an accommodating chamber, a power supply, a first connecting seat, a second connecting seat, a guiding mount, a shaft, and a motor holder; a driving motor including a worm rod; a driving gear including a through aperture, a toothed rim, and a driving tooth portion; a first rotating gear including an opening, a rotary disc, positioning blocks, and an external toothed periphery; a second rotating gear including a pore, two flexibly recessed areas, each having a sliding trench and a horizontal slot, the horizontal slot having two opposite notches, the resilient piece having two elastic elements; a fitting member including a fitting opening; a first sensing unit including at least two first coupling feet; a second sensing unit including at least two second coupling feet; a rotatable knob including a grip portion, a bar portion, and a cross hole.

3 Claims, 6 Drawing Sheets

GEAR STRUCTURE FOR ELECTRONIC LOCK

BACKGROUND OF THE INVENTION

1. Field of the Invention

The present invention relates to an electronic lock, and more particularly to a gear structure for an electronic lock which contains a first rotating gear and a second rotating gear to push a locking head of a lock latch forward or reversely easily.

2. Description of the Prior Art

Conventional electronic lock contains a rotatable knob and a grip portion, the grip portion has a bar, and the bar has a cross orifice defined on a distal end thereof so as to insert into a locking head so that the locking head expandably or retractably unlocks or locks the electronic lock; a motor including a shaft connecting with a driving gear; a transmission gear having a column mounted at a central portion thereof and coupled with the bar of the grip portion, wherein the transmission gear has a toothed surface arranged around an outer rim thereof and meshing with the driving gear, and the transmission gear having a protrusion extending outwardly from a bottom end thereof, such that the transmission gear drives the protrusion to move leftward or rightward so as to drive a first touching portion or a second touching portion after the transmission gear rotates.

However, when the motor rotates forward or reversely, it cannot contact the first touch portion or the second touch portion matingly, so the stem cannot move to a destination position exactly when the transmission gear rotates, and the first touch portion or the second touch portion is worn easily, thus lowering service life.

The present invention has arisen to mitigate and/or obviate the afore-described disadvantages.

SUMMARY OF THE INVENTION

The primary object of the present invention is to provide a gear structure for an electronic lock which is capable of overcoming the shortcomings of the conventional gear structure for the electronic lock.

To obtain the above objectives, a gear structure for an electronic lock provided by the present invention contains: a housing, a driving motor, a driving gear, a first rotating gear, a second rotating gear, a fitting member, a first sensing unit, a second sensing unit, and a rotatable knob.

The housing includes an accommodating chamber in which a controlling unit is disposed, a power supply located adjacent to the controlling unit so as to supply power, a first connecting seat and a second connecting seat which are mounted on two predetermined positions of the accommodating chamber, wherein the first connecting seat has at least one first connection hole, and the second connecting seat has at least one second connection hole, a guiding mount is fixed in the housing proximate to the first connecting seat and the second connecting seat, and wherein the guiding mount has an axial orifice defined on a central position thereof, a shaft is located adjacent to the guiding mount, and a motor holder is located proximate to the shaft.

The driving motor is fixed in the motor holder of the housing and includes a worm rod extending outwardly from one end thereof.

The driving gear includes a through aperture formed on a central position thereof, a toothed rim arranged around an outer peripheral side thereof, and a driving tooth portion disposed on a central section of a bottom end thereof, wherein the through aperture is arranged to insert the warm rod of the housing, and the toothed rim is meshed with and driven by the worm rod of the driving motor.

The first rotating gear includes an opening, wherein the opening is retained with the guiding mount of the housing, and the rotating gear also includes a rotary disc formed on an centrally recessed portion thereof and having an internal face arranged around an inner peripheral wall of the rotary disc, at least two positioning blocks fixed on two predetermined positions of the internal face, and an external toothed periphery meshing with the driving tooth portion of the driving gear.

The second rotating gear is accommodated in the rotary disc of the first rotating gear and includes a pore, wherein the pore is positioned on an upper section of the guiding mount of the housing, the second rotating gear also includes two flexibly recessed areas defined on an peripheral side thereof opposite to the at least two positioning blocks of the first rotating gear, and each flexibly recessed area has a sliding trench formed on a first predetermined position thereof and a horizontal slot defined on a second predetermined position thereof, the horizontal slot has two opposite notches extending outwardly therefrom and used to accommodate a resilient piece, the resilient piece has two elastic elements disposed on two predetermined positions of one surfaces thereof and retained in the two opposite notches, such that a central portion of the resilient piece exposes outside each flexibly recessed area and abuts against a biasing element, wherein the biasing element has a slidable portion, a tilted contacting face defined on a front surface of the slidable portion, and a sliding section, between the slidable portion and the biasing element is formed a fixing groove for retaining with the central portion of the resilient piece, such that the biasing element and the resilient piece are driven to cause flexibility, and the biasing element is rotated by the first rotating gear to abut against the at least two positioning blocks so as to return back to an original position.

The fitting member includes a fitting opening formed therein, wherein an outer peripheral side of the fitting member connects with an inner wall of the pore of the second rotating gear.

The first sensing unit includes at least two first coupling feet secured in the at least one first connection hole of the housing.

The second sensing unit includes at least two second coupling feet secured in the at least one second connection hole of the housing.

The rotatable knob includes a grip portion, a bar portion formed on one end of the grip portion, a cross hole arranged on a distal end of the bar portion, such that the bar portion of the rotatable knob is inserted and rotated in the axial orifice of the housing, and the bar portion is further inserted into a mouth of a fitting member so that the bar portion is stopped by an inner wall of the housing.

Thereby, the at least two positioning blocks of the first rotating gear and the biasing element of the second rotating gear are served to drive the controlling unit by which the first rotating gear and the second rotating gear are pushed to rotate, and the locking head is driven to rotate forward or reversely, thus turning on/off the electronic lock easily.

DETAILED DESCRIPTION OF THE PREFERRED EMBODIMENT

The present invention will be clearer from the following description when viewed together with the accompanying drawings, which show, for purpose of illustrations only, a first embodiment in accordance with the present invention.

Figure 1:
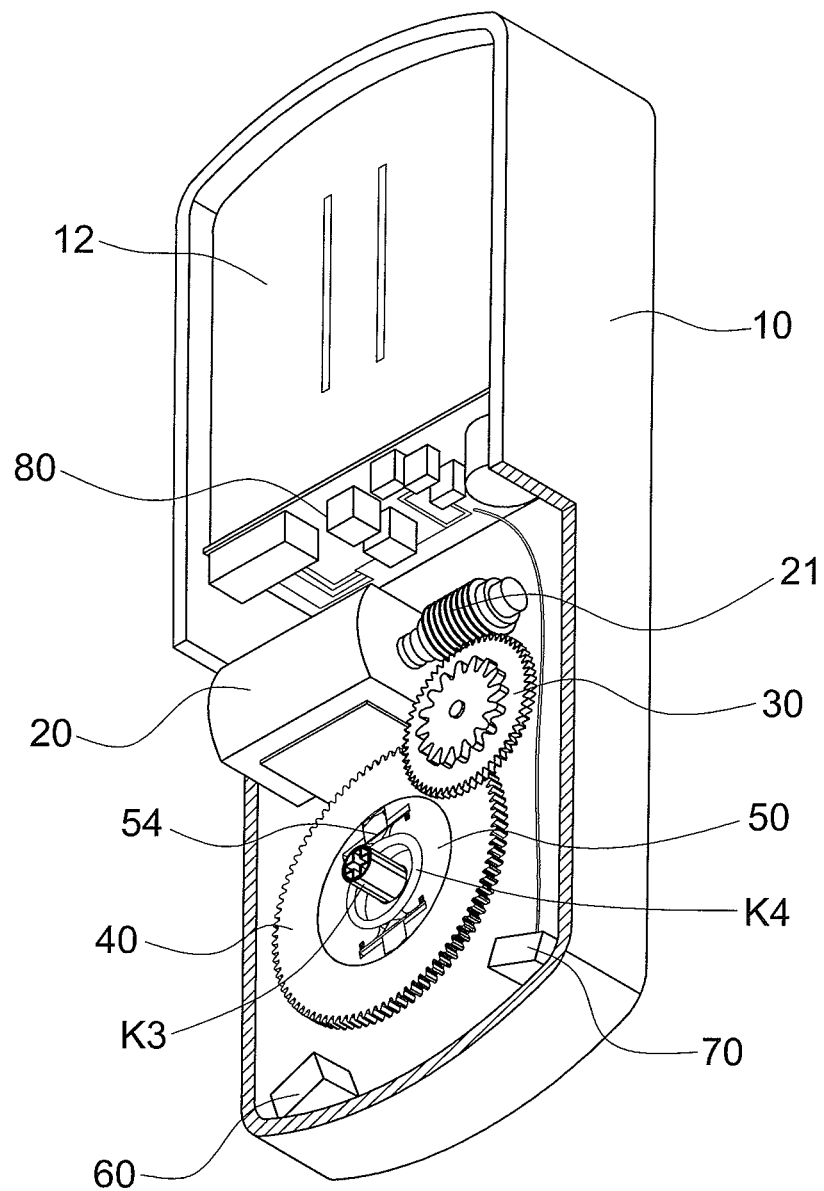
FIG. 1 is a perspective view showing the assembly of a gear structure for an electronic lock according to a preferred embodiment of the present invention.
Figure 2:
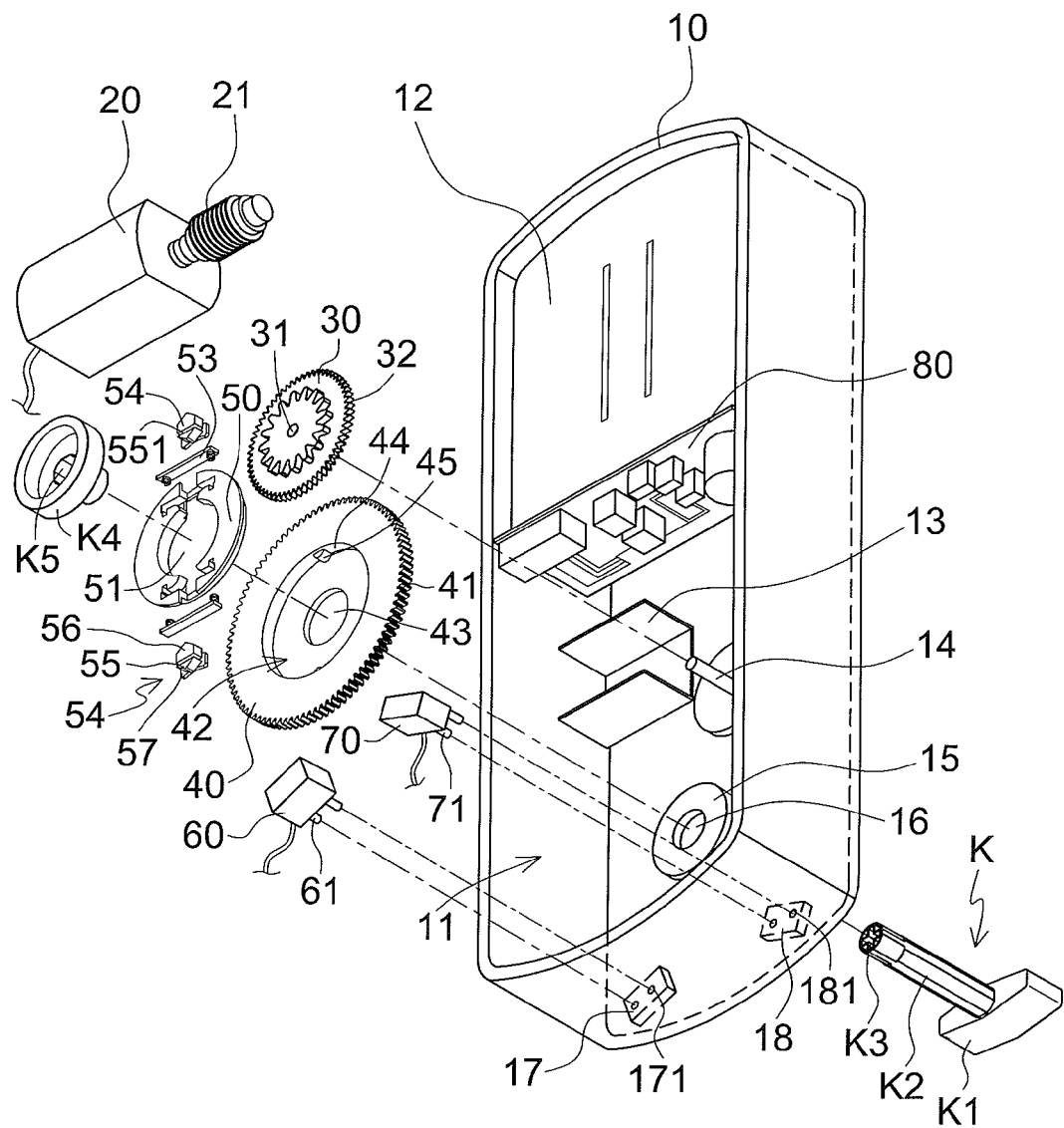
FIG. 2 is a perspective view showing the exploded components of the gear structure for the electronic lock according to the preferred embodiment of the present invention.
Figure 3:
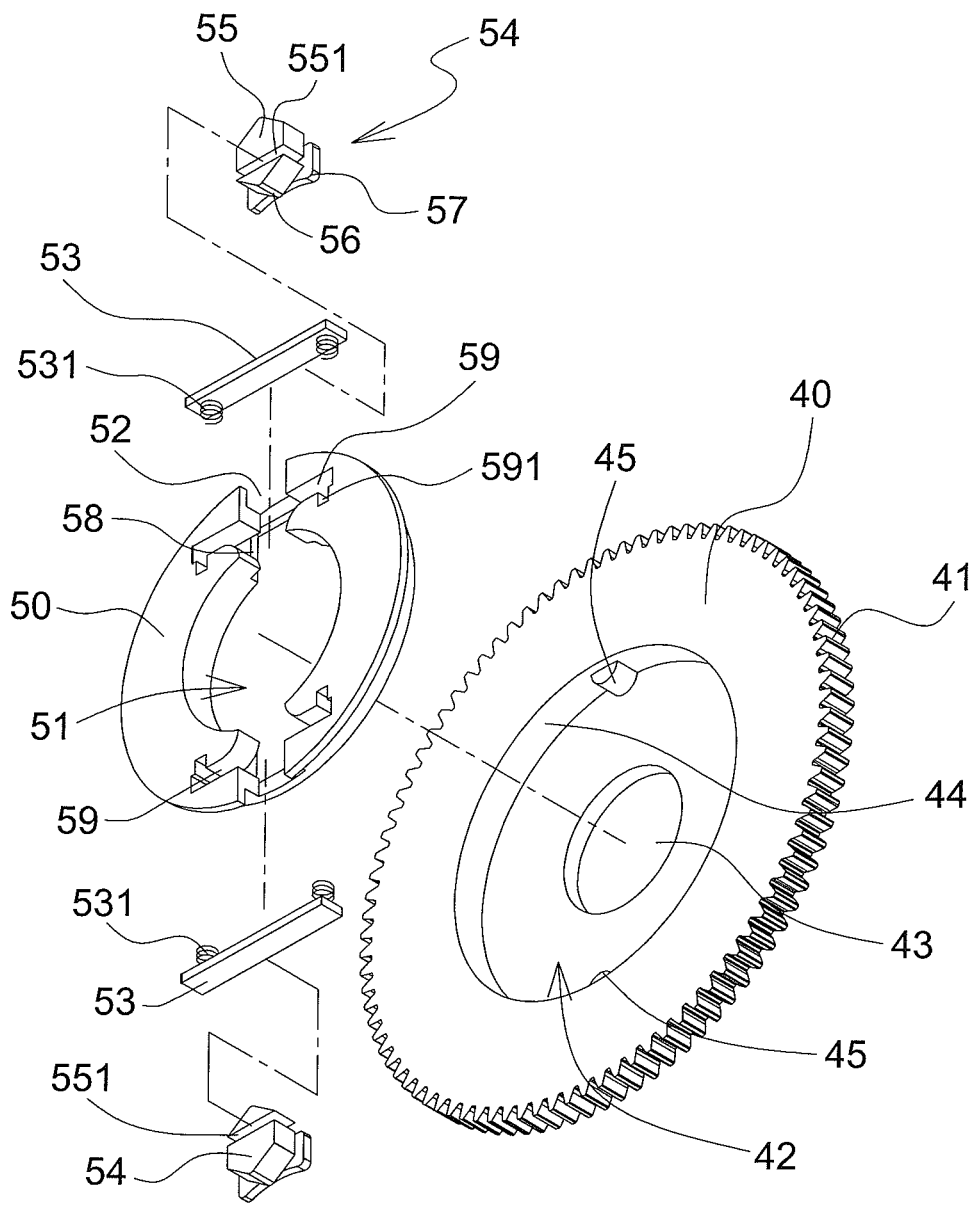
FIG. 3 is a perspective view showing the exploded components of a first rotating gear and a second rotating gear of the gear structure for the electronic lock according to the preferred embodiment of the present invention.
Figure 4:
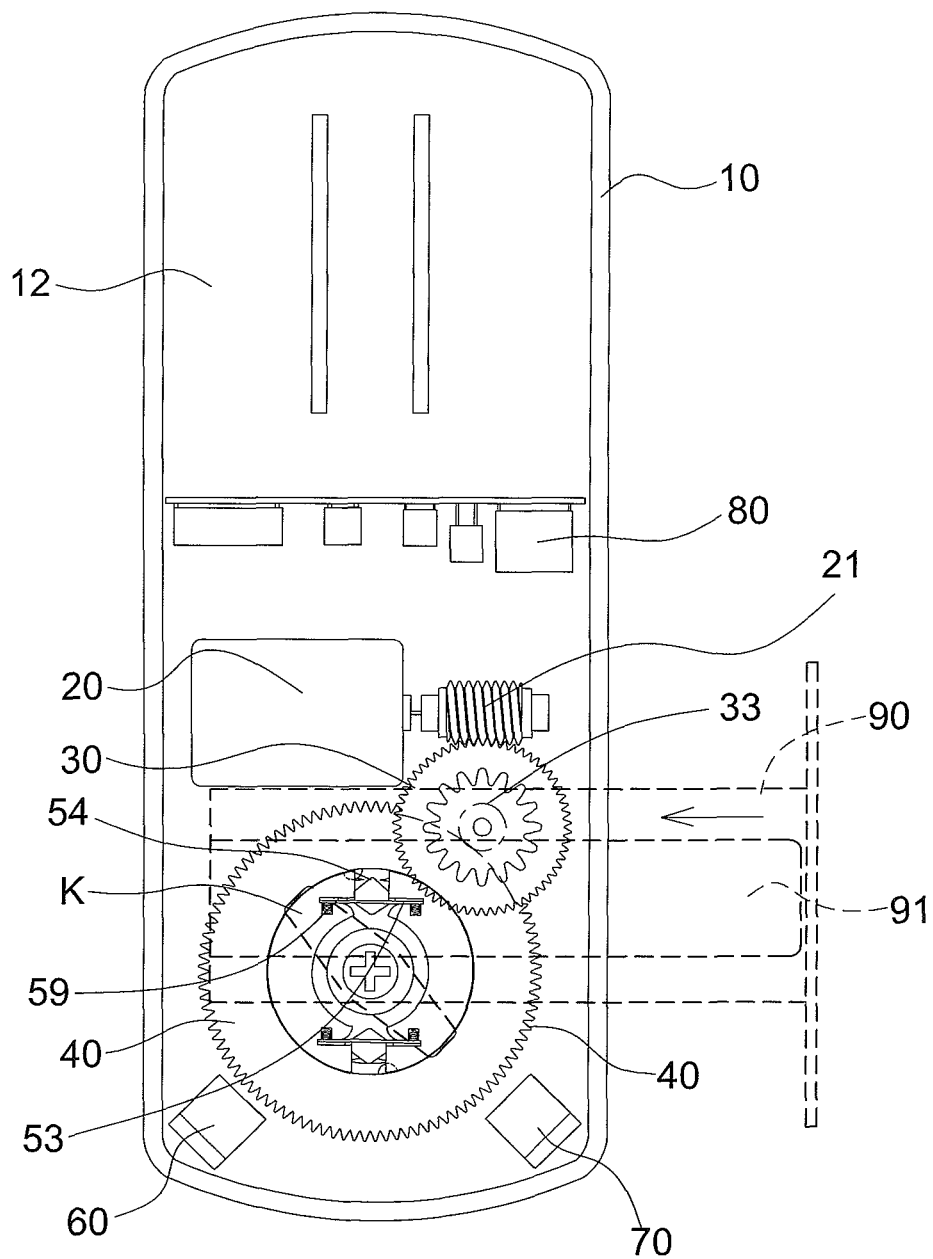
FIG. 4 is a plan view showing the operation of the gear structure for the electronic lock according to the preferred embodiment of the present invention.
Figure 5:
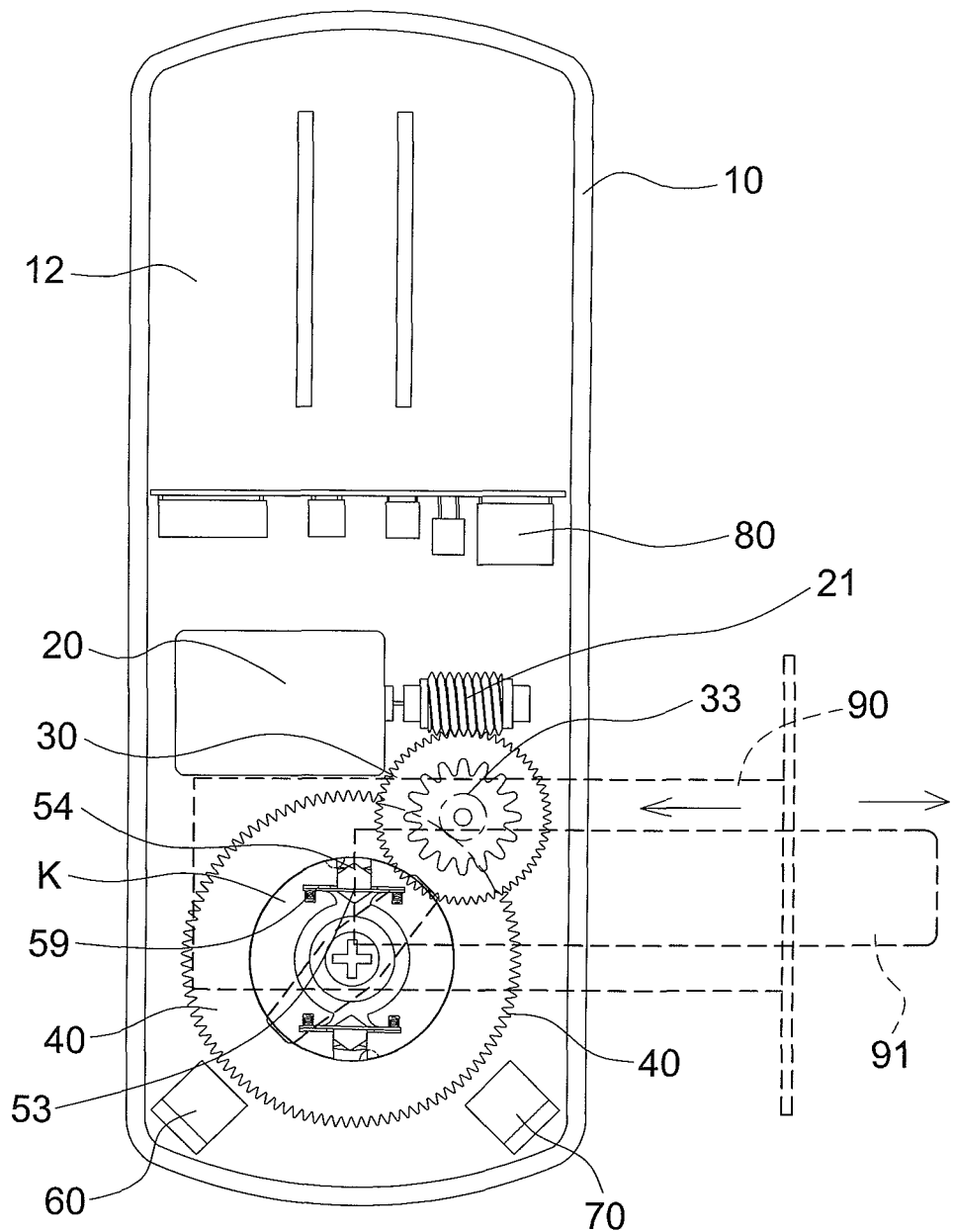
FIG. 5 is another plan view showing the operation of the gear structure for the electronic lock according to the preferred embodiment of the present invention.
Figure 6:
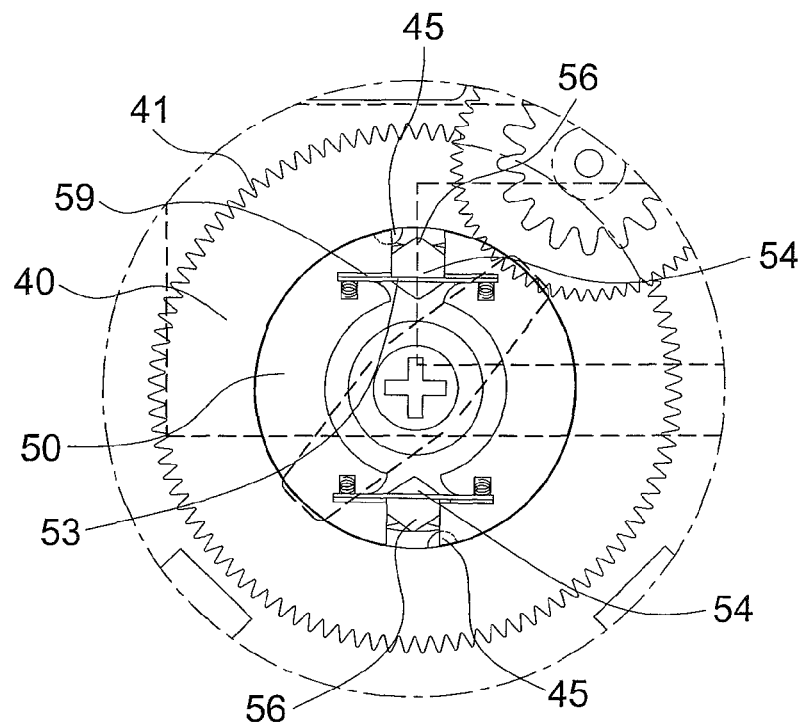
FIG. 6 is an amplified plan view showing the operation of a part of the gear structure for the electronic lock according to the preferred embodiment of the present invention.
Figure 7:
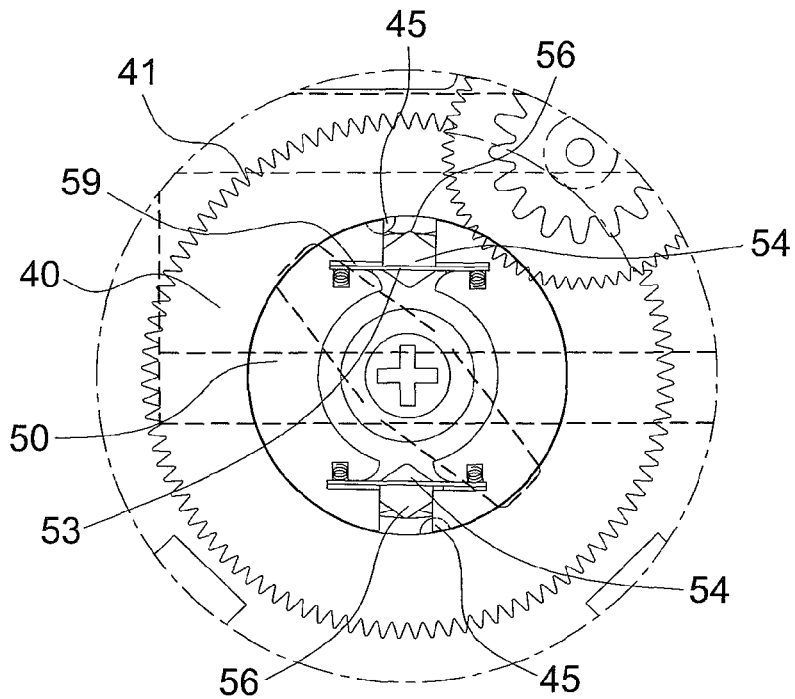
FIG. 7 is another amplified plan view showing the operation of a part of the gear structure for the electronic lock according to the preferred embodiment of the present invention.

With reference to FIGS. 1-7, a gear structure for an electronic lock according to a preferred embodiment of the present invention comprises:

a housing 10 including an accommodating chamber 11 in which a controlling unit 80 is disposed, a power supply 12 located adjacent to the controlling unit 80 so as to supply power, a first connecting seat 17 and a second connecting seat 18 which are mounted on two predetermined positions of the accommodating chamber 11, wherein the first connecting seat 17 has at least one first connection hole 171, and the second connecting seat 18 has at least one second connection hole 181, a guiding mount 15 is fixed in the housing 10 proximate to the first connecting seat 17 and the second connecting seat 18, wherein the guiding mount 15 has an axial orifice 16 defined on a central position thereof, a shaft 14 is located adjacent to the guiding mount 15, and a motor holder 13 is located proximate to the shaft 14;

a driving motor 20 fixed in the motor holder 13 of the housing 10 and including a worm rod 21 extending outwardly from one end thereof;

a driving gear 30 including a through aperture 31 formed on a central position thereof, a toothed rim 32 arranged around an outer peripheral side thereof, a driving tooth portion 33 disposed on a central section of a bottom end thereof, wherein the through aperture 31 is arranged to insert the warm rod 14 of the housing 10, and the toothed rim 32 is meshed with and driven by the worm rod 21 of the driving motor 20;

a first rotating gear 40 including an opening 43, wherein the opening 43 is retained with the guiding mount 15 of the housing 10, and the rotating gear 40 also includes a rotary disc 42 formed on an centrally recessed portion thereof and having an internal face 44 arranged around an inner peripheral wall of the rotary disc 42, at least two positioning blocks 45 fixed on two predetermined positions of the internal face 44 in a multi-section fixing manner, and an external toothed periphery 41 meshing with the driving tooth portion 33 of the driving gear 30;

a second rotating gear 50 accommodated in the rotary disc 42 of the first rotating gear 40 and including a pore 51, wherein the pore 51 is positioned on an upper section of the guiding mount 15 of the housing 10, the second rotating gear 50 also includes two flexibly recessed areas 52 defined on an peripheral side thereof opposite to the at least two positioning blocks 45 of the first rotating gear 40, and each flexibly recessed area 52 has a sliding trench 58 formed on a first predetermined position thereof and a horizontal slot 59 defined on a second predetermined position thereof, the horizontal slot 59 has two opposite notches 591 extending outwardly therefrom and used to accommodate a resilient piece 53, the resilient piece 53 has two elastic elements 531 disposed on two predetermined positions of one surfaces thereof and retained in the two opposite notches 591, such that a central portion of the resilient piece 53 exposes outside each flexibly recessed area 52 and abuts against a biasing element 54, wherein the biasing element 54 has a slidable portion 57, a tilted contacting face 55 defined on a front surface of the slidable portion 57, and a sliding section 56, between the slidable portion 57 and the biasing element 54 is formed a fixing groove 551 for retaining with the central portion of the resilient piece 53, such that the biasing element 54 and the resilient piece 53 are driven to cause flexibility, and the biasing element 54 is rotated by the first rotating gear 40 to abut against the at least two positioning blocks 45 so as to return back to an original position;

a fitting member K4 including a fitting opening K5 formed therein, wherein an outer peripheral side of the fitting member K4 connects with an inner wall of the pore 51 of the second rotating gear 50;

a first sensing unit 60 including at least two first coupling feet 61 secured in the at least one first connection hole 171 of the housing 10;

a second sensing unit 70 including at least two second coupling feet 71 secured in the at least one second connection hole 181 of the housing 10;

a rotatable knob K including a grip portion K1, a bar portion K2 formed on one end of the grip portion K1, a cross hole K3 arranged on a distal end of the bar portion K3, such that the bar portion K2 of the rotatable knob K is inserted and rotated in the axial orifice 16 of the housing 10, and the bar portion K2 is further inserted into a mouth K5 of a fitting member K4 so that the bar portion K1 is stopped by an inner wall of the housing 10; wherein the cross hole K3 of the rotatable knob K controls a locking head 91 of a lock latch 90 to turn on/off in a multi-section controlling manner.

Thereby, the at least two positioning blocks 45 of the first rotating gear 40 and the biasing element 54 of the second rotating gear 50 are served to drive the controlling unit 80 by which the first rotating gear 40 and the second rotating gear 50 are pushed to rotate, and the locking head 91 is driven to rotate forward or reversely, thus turning on/off the electronic lock easily.

While we have shown and described various embodiments in accordance with the present invention, it is clear to those skilled in the art that further embodiments may be made without departing from the scope of the present invention.

What is claimed is:

1. A gear structure for an electronic lock comprising:
a housing including an accommodating chamber in which a controlling unit is disposed, a power supply located adjacent to the controlling unit so as to supply power, a first connecting seat and a second connecting seat which are mounted on two predetermined positions of the accommodating chamber, wherein the first connecting seat has at least one first connection hole, and the second connecting seat has at least one second connection hole, a guiding mount is fixed in the housing proximate to the first connecting seat and the second connecting seat, and wherein the guiding mount has an axial orifice defined on a central position thereof, a shaft is located adjacent to the guiding mount, and a motor holder is located proximate to the shaft;

a driving motor fixed in the motor holder of the housing and including a worm rod extending outwardly from one end thereof;

a driving gear including a through aperture formed on a central position thereof, a toothed rim arranged around an outer peripheral side thereof, a driving tooth portion disposed on a central section of a bottom end thereof, wherein the through aperture is arranged to insert the shaft of the housing, and the toothed rim is meshed with and driven by the worm rod of the driving motor;

a first rotating gear including an opening, wherein the opening is retained with the guiding mount of the housing, and the rotating gear also includes a rotary disc formed on an centrally recessed portion thereof and having an internal face arranged around an inner peripheral wall of the rotary disc, at least two positioning blocks fixed on two predetermined positions of the internal face, and an external toothed periphery meshing with the driving tooth portion of the driving gear;

a rotating member accommodated in the rotary disc of the first rotating gear and including a hole, wherein the hole is positioned on an upper section of the guiding mount of the housing, the second rotating gear also includes two flexibly recessed areas defined on an peripheral side thereof opposite to the at least two positioning blocks of the first rotating gear, and each flexibly recessed area has a sliding trench formed on a first predetermined position thereof and a horizontal slot defined on a second predetermined position thereof, the horizontal slot has two opposite notches extending outwardly therefrom and used to accommodate a resilient piece, the resilient piece has two elastic elements disposed on two predetermined positions of one surface thereof and retained in the two opposite notches, such that a central portion of the resilient piece exposes outside each flexibly recessed area and abuts against a biasing element, wherein the biasing element has a slidable portion, a tilted contacting face defined on a front surface of the slidable portion, and a sliding section, between the slidable portion and the biasing element is formed a fixing groove for retaining with the central portion of the resilient piece, such that the biasing element and the resilient piece are driven to cause flexibility, and the biasing element is rotated by the first rotating gear to abut against the at least two positioning blocks so as to return back to an original position;

a fitting member including a fitting opening formed therein, wherein an outer peripheral side of the fitting member connects with an inner wall of the hole of the rotating member;

a first sensing unit including at least two first coupling feet secured in the at least one first connection hole of the housing;

a second sensing unit including at least two second coupling feet secured in the at least one second connection hole of the housing;

a rotatable knob including a grip portion, a bar portion formed on one end of the grip portion, a cross hole arranged on a distal end of the bar portion, such that the bar portion of the rotatable knob is inserted and rotated in the axial orifice of the housing, and the bar portion is further inserted into a mouth of a fitting member so that the bar portion is stopped by an inner wall of the housing.

2. The gear structure for the electronic lock as claimed in claim 1, wherein at least two positioning blocks of the first rotating gear are fixed on the internal face.

3. The gear structure for the electronic lock as claimed in claim 1, wherein the cross hole of the rotatable knob controls a locking head of a lock latch.

\* \* \* \* \*